US012789878B2

(12) United States Patent
Yuan

(10) Patent No.: US 12,789,878 B2
(45) Date of Patent: Nov. 10, 2026

(54) BABY CARRIAGE

(71) Applicant: Wonderland Switzerland AG, Steinhausen (CH)

(72) Inventor: Jialiang Yuan, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 274 days.

(21) Appl. No.: 18/695,512

(22) PCT Filed: Sep. 28, 2022

(86) PCT No.: PCT/EP2022/077014

§ 371 (c)(1),
(2) Date: Mar. 26, 2024

(87) PCT Pub. No.: WO2023/052445

PCT Pub. Date: Apr. 6, 2023

(65) Prior Publication Data

US 2024/0400124 A1 Dec. 5, 2024

(30) Foreign Application Priority Data

Sep. 28, 2021 (CN) .......................... 202111143389.1

(51) Int. Cl.
*B62B 7/10* (2006.01)
*B62B 7/06* (2006.01)
*B62B 9/20* (2006.01)

(52) U.S. Cl.
CPC ................ *B62B 7/10* (2013.01); *B62B 7/062* (2013.01); *B62B 7/064* (2013.01); *B62B 9/20* (2013.01); *B62B 2205/24* (2013.01)

(58) Field of Classification Search
CPC ........... B62B 7/062; B62B 7/064; B62B 7/10; B62B 9/20; B62B 2205/24
See application file for complete search history.

(56) References Cited

U.S. PATENT DOCUMENTS

2015/0274188 A1 10/2015 Li
2017/0021851 A1* 1/2017 Pujol ......................... B62B 7/06
(Continued)

FOREIGN PATENT DOCUMENTS

CN 102211605 A 10/2011
CN 106143575 A 11/2016
(Continued)

OTHER PUBLICATIONS

CN 1st Office Action with English Translation; App No. 202111143389.1; Date Mailed: Dec. 8, 2015; pp. 1-14.
(Continued)

*Primary Examiner* — Alexander K Garlen
(74) *Attorney, Agent, or Firm* — CANTOR COLBURN LLP

(57) ABSTRACT

The present disclosure provides a baby carriage. The baby carriage has an unfolded state and a folded state, and includes a handle, a front leg, a rear leg. The handle, the front leg and the rear leg may be pivoted to the unfolded state or the folded state with respect to each other. The handle includes a handle upper joint and a handle lower joint, which may be pivoted to the unfolded state or the folded state with respect to each other. The baby carriage also includes a limiting part, and in the folded state, the limiting part prevents the handle upper joint from pivoting towards the unfolded state. The baby carriage provided by the present disclosure can effectively prevent the handle or a canopy from being unfolded when the baby carriage is folded and carried.

13 Claims, 19 Drawing Sheets

(56) References Cited

U.S. PATENT DOCUMENTS

| | | | | |
|---|---|---|---|---|
| 2017/0050660 | A1* | 2/2017 | Xu | B62B 7/08 |
| 2017/0144687 | A1* | 5/2017 | Li | B62B 7/062 |
| 2017/0174244 | A1* | 6/2017 | Sack | B62B 9/12 |
| 2017/0313337 | A1* | 11/2017 | Horst | B62B 7/044 |
| 2018/0141578 | A1* | 5/2018 | Yuan | B62B 7/044 |
| 2020/0353967 | A1* | 11/2020 | Horst | B62B 9/20 |
| 2022/0169297 | A1* | 6/2022 | Pujol | B62B 7/062 |

FOREIGN PATENT DOCUMENTS

| | | | | | |
|---|---|---|---|---|---|
| CN | 205769507 | U | | 12/2016 | |
| CN | 205854241 | U | | 1/2017 | |
| CN | 106627716 | A | | 5/2017 | |
| CN | 106741091 | B | | 4/2019 | |
| CN | 110329334 | A | * | 10/2019 | B62B 7/083 |
| CN | 209535175 | U | * | 10/2019 | |
| CN | 210618246 | U | | 5/2020 | |
| DE | 102008002834 | A1 | | 12/2009 | |
| DE | 102011109232 | A1 | | 2/2012 | |
| DE | 202015102869 | U1 | * | 6/2015 | B62B 7/08 |
| EP | 3121093 | A2 | | 1/2017 | |
| JP | 2015532903 | A | | 11/2015 | |
| JP | 2017095087 | A | | 6/2017 | |
| JP | 2019064588 | A | | 4/2019 | |
| TW | 202120366 | A | | 6/2021 | |
| WO | WO-2009132985 | A1 | * | 11/2009 | B62B 7/08 |

OTHER PUBLICATIONS

PCT International Search Report ISR and Written Opinion of the International Searching Authority; International Application No. PCT/EP2022/077014; International Filing Date: Sep. 28, 2022; Date Mailed: Jan. 18, 2023; pp. 1-10.

TW 1st Office Action; TW Application No. TW111136800; Date Mailed: Aug. 10, 2023; pp. 1-7.

JP 1st Office Action w English; Application No. 2024-519120; Mailing Date: May 7, 2025; pp. 1-11.

JP Search Report w English; Application No. 2024-519120; Mailing Date: Mar. 17, 2025; pp. 1-23.

* cited by examiner

BABY CARRIAGE

CROSS-REFERENCE TO RELATED APPLICATIONS

This application is a National Stage application of PCT/EP2022/077014, filed on Sep. 28, 2022, which claims the benefit of Chinese Application No. 202111143389.1, filed on Sep. 28, 2021, both of which are incorporated herein by reference in their entirety.

TECHNICAL FIELD

The present disclosure relates to the technical field of baby carriages, in particular to a baby carriage which may be reliably folded.

BACKGROUND

A baby carriage is a tool vehicle designed to provide convenience of a child in outdoor activities, and has been widely used. In order to make baby carriages more convenient to carry and store, the baby carriage in the conventional art is designed as a foldable structure, so that when not in use, the baby carriage may be folded into a smaller volume for easy carrying and storage.

At present, baby carriages which are smaller after being folded and can be taken on an airplane are popular. This kind of baby carriages is compact after being folded, so that it is convenient for users to carry. However, during use, there may be a situation, that is, although a frame and a handle are folded, the handle or a canopy may automatically open during carrying, which will affect the user to carry it onto the plane or carry it out.

Therefore, there is a need for a baby carriage that can prevent the handle and/or the canopy from automatically opening.

SUMMARY

The present disclosure provides a baby carriage. The baby carriage has an unfolded state and a folded state, and includes a handle, a front leg, and a rear leg. The handle, the front leg and the rear leg are pivotable to the unfolded state or the folded state with respect to each other. The handle includes a handle upper joint and a handle lower joint, and the handle upper joint and the handle lower joint are pivotable to the unfolded state or the folded state with respect to each other. The baby carriage also includes a limiting part, and in the folded state, the limiting part prevents the handle upper joint from pivoting towards the unfolded state.

BRIEF DESCRIPTION OF THE DRAWINGS

Various objects, features and advantages of the present disclosure will become more apparent by considering the following detailed description of preferred embodiments of the present disclosure in conjunction with the accompanying drawings. The drawings are only exemplary illustrations of the present disclosure and are not necessarily drawn to scale. In the drawings, the same reference numbers refer to the same or similar parts, wherein.

LIST OF REFERENCE NUMBERS

Figure 1:
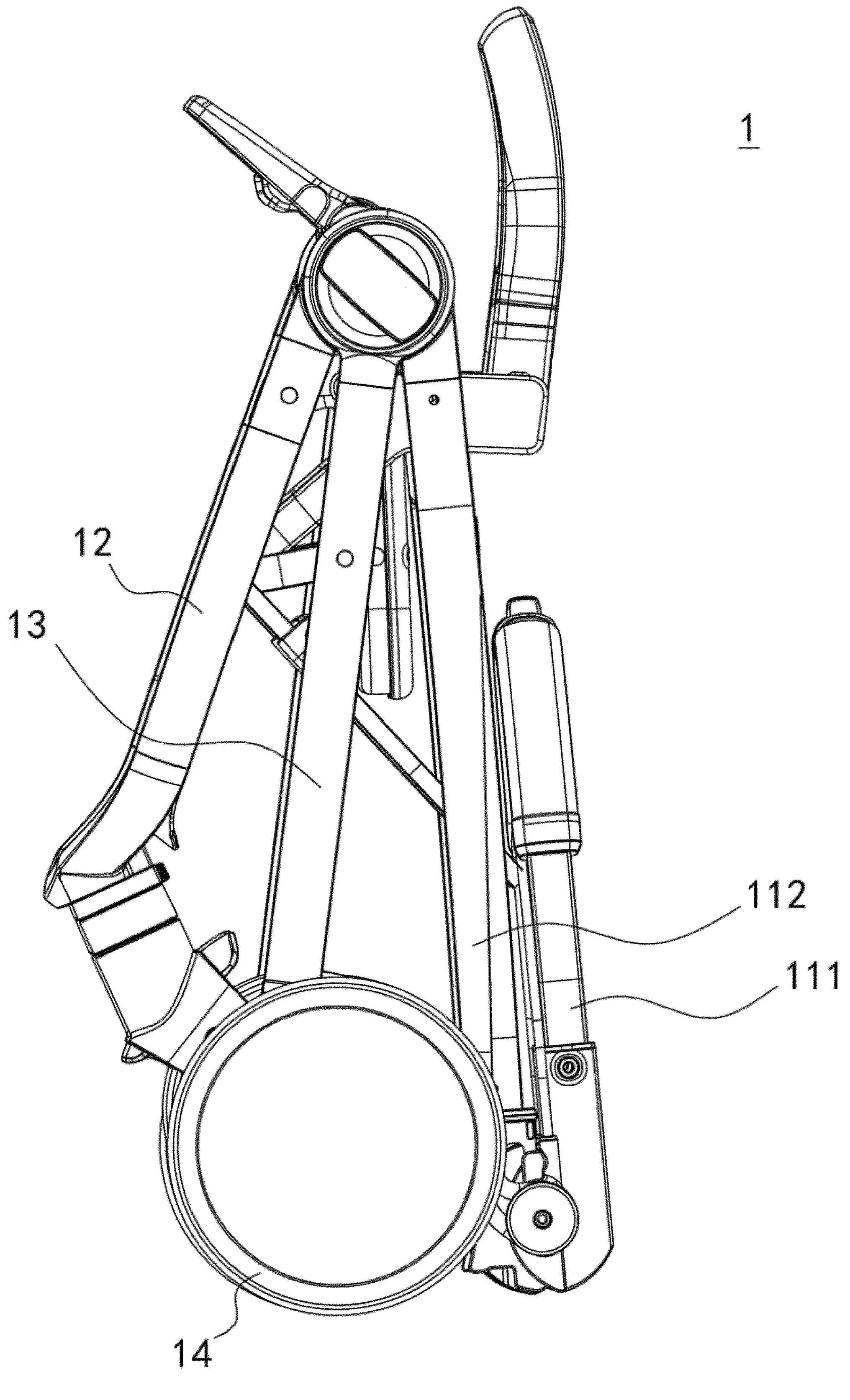
FIG. 1 is a side view of a baby carriage according to an embodiment of the present disclosure, in which the baby carriage is in a folded state.

- Baby Carriage 1
  - Handle 11
    - Handle Upper Joint 111
      - First Pivoting Part 1131
        - First Plate Part 11311
        - Second Plate Part 11312
        - Edge 11313
    - Handle Lower Joint 112
      - Second Pivoting Part 1132
        - Third Plate Part 11321
        - Fourth Plate Part 11322
        - Edge 11323
    - Limiting Part 114
    - Unfolding Groove 115
    - Folding Groove 116
    - Limiting Hole 117
  - Front Leg 12
  - Rear Leg 13
  - Wheel 14
  - Canopy Bracket 15
    - First Canopy Bracket 151
    - Second Canopy Bracket 152
  - Seat 16

DETAILED DESCRIPTION

In order to explain the whole concept of the present disclosure more clearly, the following detailed description will be made by way of example with reference to the attached drawings of the specification.

It should be noted that in the following description, many specific details are set forth in order to fully understand the present disclosure. However, the present disclosure can be implemented in other ways different from those described here. Therefore, the protection scope of the present disclosure is not limited by the specific embodiments disclosed below.

In addition, in the description of the present disclosure, it should be understood that the terms “center”, “up”, “down”, “front”, “back”, “left”, “right”, “vertical”, “horizontal”, “top”, “bottom”, “inside”, “outside”, “axial”, “radial”, “circumferential”, etc. indicate the orientation or positional relationship based on the orientation or positional relationship shown in the drawings, which are only for the convenience of describing the present disclosure and simplifying the description, rather than indicating or implying that the indicated device or component must have a specific orientation, or must be constructed and operated in a specific orientation, and therefore should not be construed as a limitation on the present disclosure.

In the present disclosure, unless otherwise specified and limited, the terms “installed”, “connected”, “coupled” and “fixed” should be understood broadly, for example, may be fixed, detachable or integrated; or may be directly connected or indirectly connected through an intermediate medium, and may be in an internal communication of two components or an interaction between two components. However, direct connection means that two connected subjects do not build a connection relationship through excessive structure, but only form an integrated part through a connection structure. For those of ordinary skill in the art, the specific meanings of the above terms in the present disclosure can be understood according to specific situations.

In the present disclosure, unless otherwise specified and limited, a first feature “on” or “under” a second feature may be in direct contact between the first and second features, or in indirect contact between the first and second features through an intermediate medium. In the description of this specification, the description referring to the terms “an embodiment”, “some embodiments”, “example”, “specific example” or “some examples” means that the specific features, structures, materials or characteristics described in connection with the embodiment or example are included in at least one embodiment or example of the present disclosure. In this specification, the schematic expressions of the above terms do not necessarily refer to the same embodiment or example. Furthermore, the specific features, structures, materials or characteristics described may be combined in any one or more embodiments or examples in a suitable manner.

Figure 2:
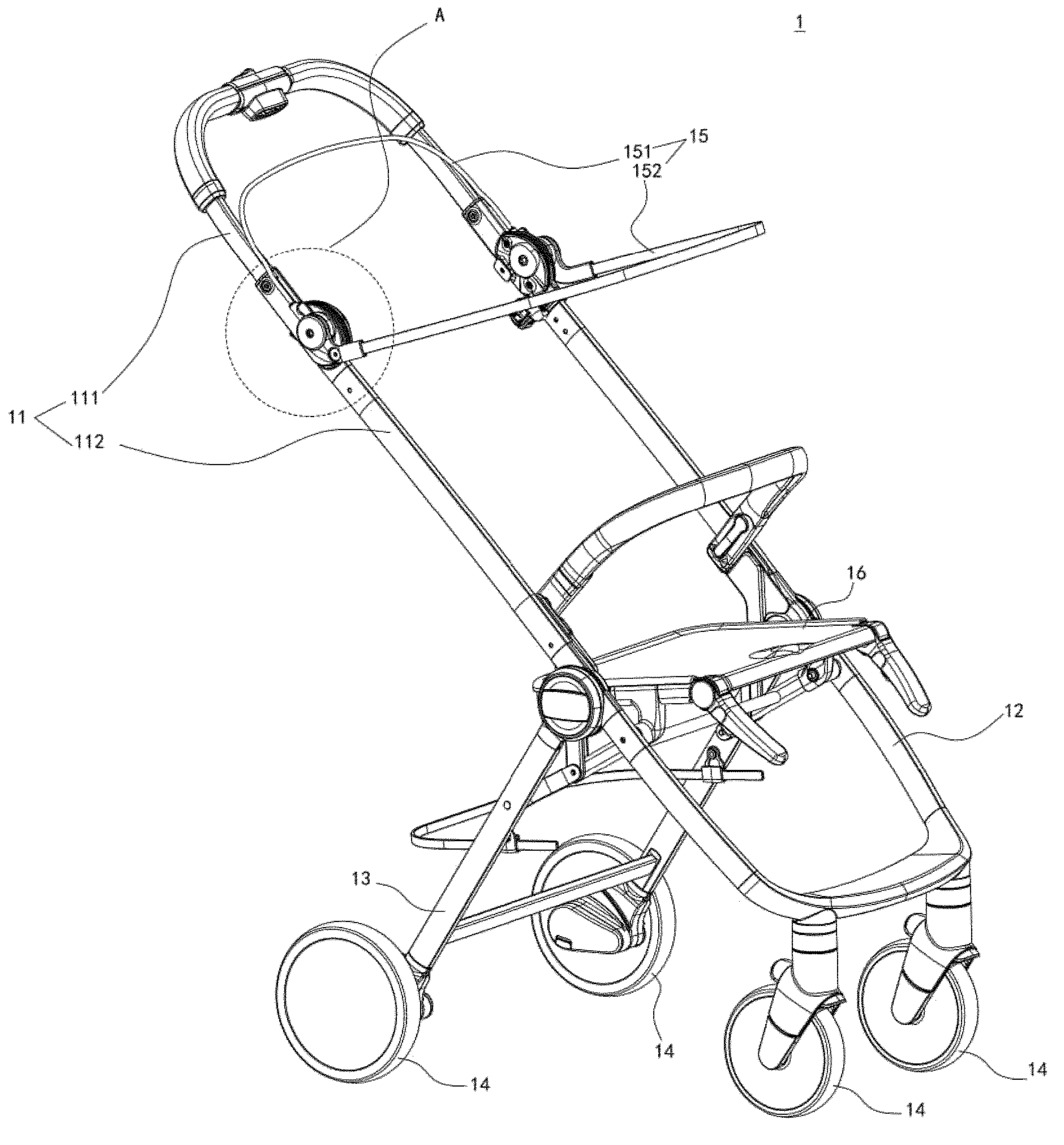
FIG. 2 is a perspective view of the baby carriage according to the embodiment of the present disclosure, in which the baby carriage is in an unfolded state.

FIG. 1 is a side view of a baby carriage according to an embodiment of the present disclosure, in which the baby carriage is in a folded state, and FIG. 2 is a perspective view of the baby carriage according to the embodiment of the present disclosure, in which the baby carriage is in an unfolded state.

The baby carriage 1 of the present disclosure has an unfolded state (as shown in FIG. 2) and a folded state (as shown in FIG. 1). The baby carriage 1 includes a handle 11, a front leg 12, a rear leg 13 and wheels 14. The wheels 14 may be provided at an end of the front leg 12 and an end of the rear leg 13, respectively, so that the baby carriage 1 may be pushed. The handle 11, the front leg 12 and the rear leg 13 are pivotable to an unfolded state or a folded state with respect to each other. In this embodiment, the baby carriage 1 has four wheels 14, but the present disclosure is not limited thereto. Alternatively, the baby carriage 1 may have three wheels, or more than four wheels. The baby carriage 1 may also include a seat 16 for a baby to sit, and may also include other components to constitute different parts of the baby carriage.

The handle 11 includes a handle upper joint 111 and a handle lower joint 112. The handle upper joint 111 and the handle lower joint 112 are pivotable to the unfolded state or the folded state with respect to each other. As shown in FIG. 1, in the folded state, the handle upper joint 111 is in a substantially vertical posture. An elastic element (for example, a torsion spring) may be provided in the handle 11, and the elastic element may apply a force on the handle upper joint 111 to move towards the folded state.

The baby carriage also includes a limiting structure (which will be described in detail below), such as an elastic blocking component and a structure in which a projection is engaged with a limiting hole. In the folded state, the limiting structure may prevent the handle upper joint 111 from pivoting towards the unfolded state. The term “prevent” in the present disclosure may include partial blocking, that is, when the force applied on the limiting structure exceeds a threshold value, the limiting structure may no longer have the blocking effect. The threshold value may be, for example, within a range of force that the user’s arm can provide.

Figure 3:
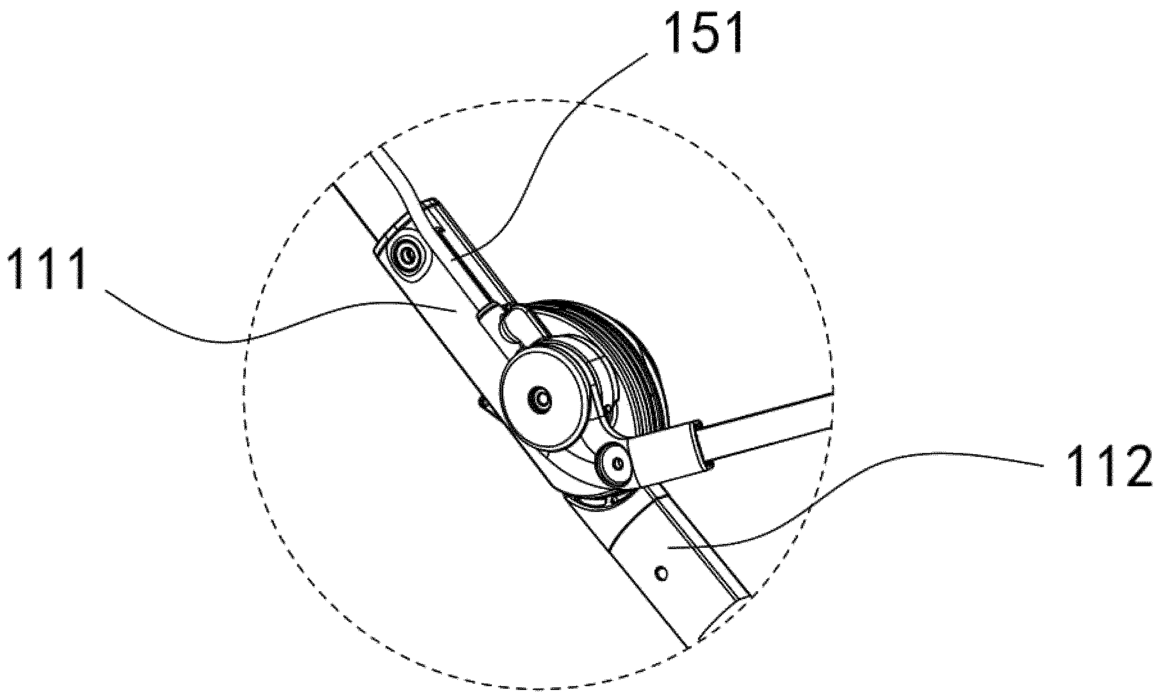
FIG. 3 is a partial enlarged view of a part A of FIG. 2.
Figure 4:
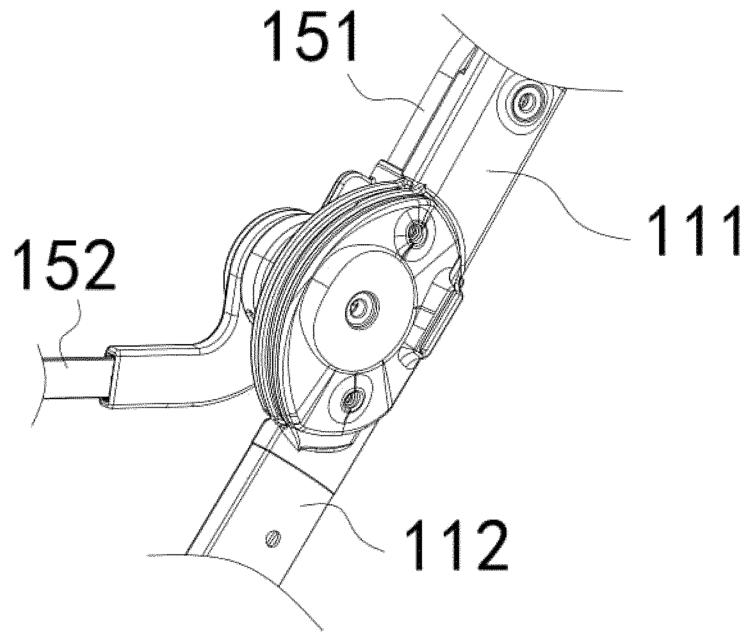
FIG. 4 is a partial enlarged view of the part A of FIG. 2 from another angle.

FIG. 3 is a partial enlarged view of a part A of FIG. 2, and FIG. 4 is a partial enlarged view of the part A of FIG. 2 from another angle.

Referring to FIGS. 1 to 4, the baby carriage 1 further includes a canopy bracket 15. The canopy bracket 15 may include a first canopy bracket 151 and a second canopy bracket 152. The first canopy bracket 151 may pivot together with the handle upper joint 111 along a same pivot axis. The canopy bracket 15 may be used as a frame of a canopy (not shown). For example, the canopy may be made of fabric, which may be unfolded and folded to realize the function of blocking light as required.

Figure 5:
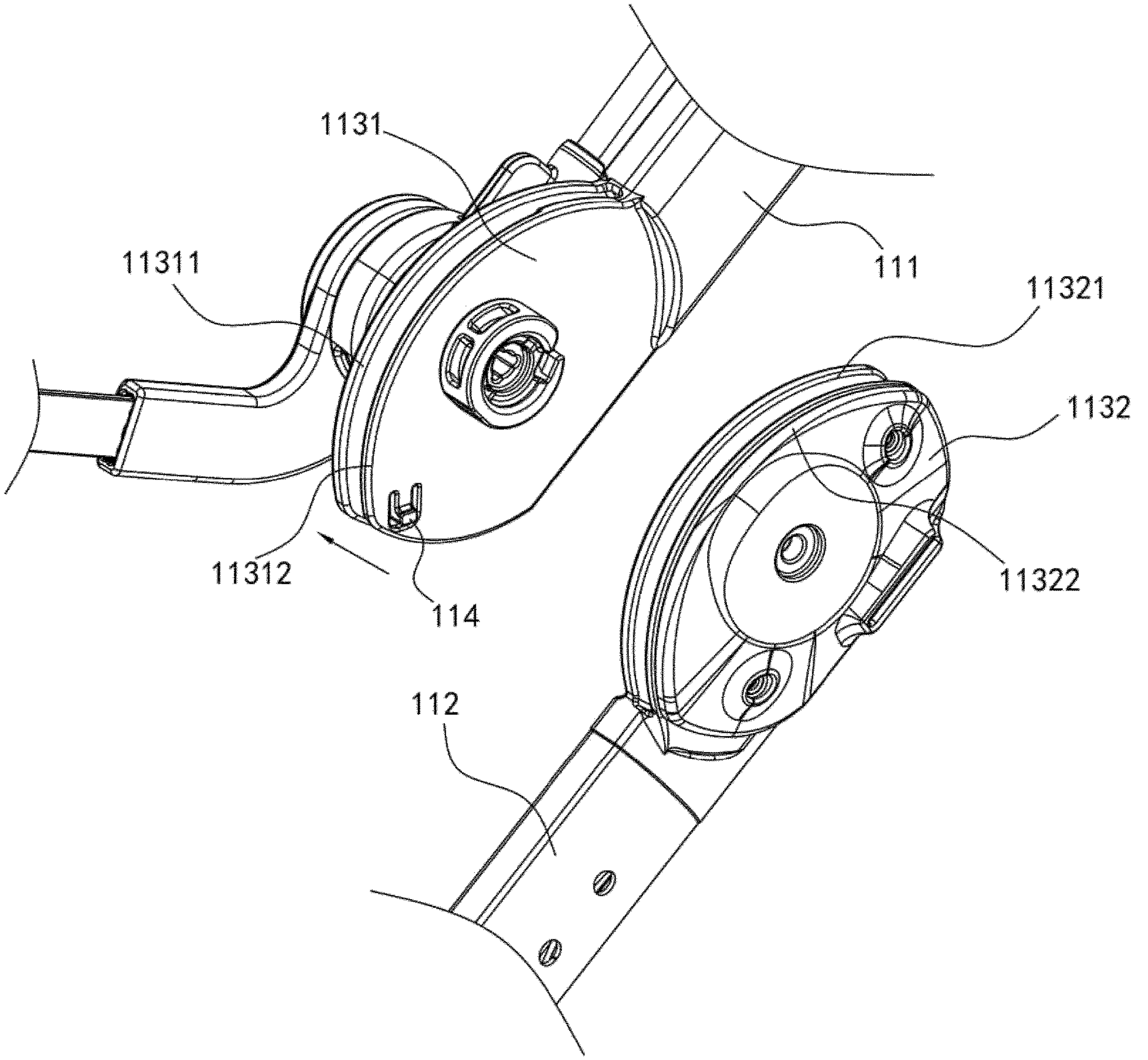
FIG. 5 is an exploded perspective view of a part shown in FIG. 4.
Figure 6:
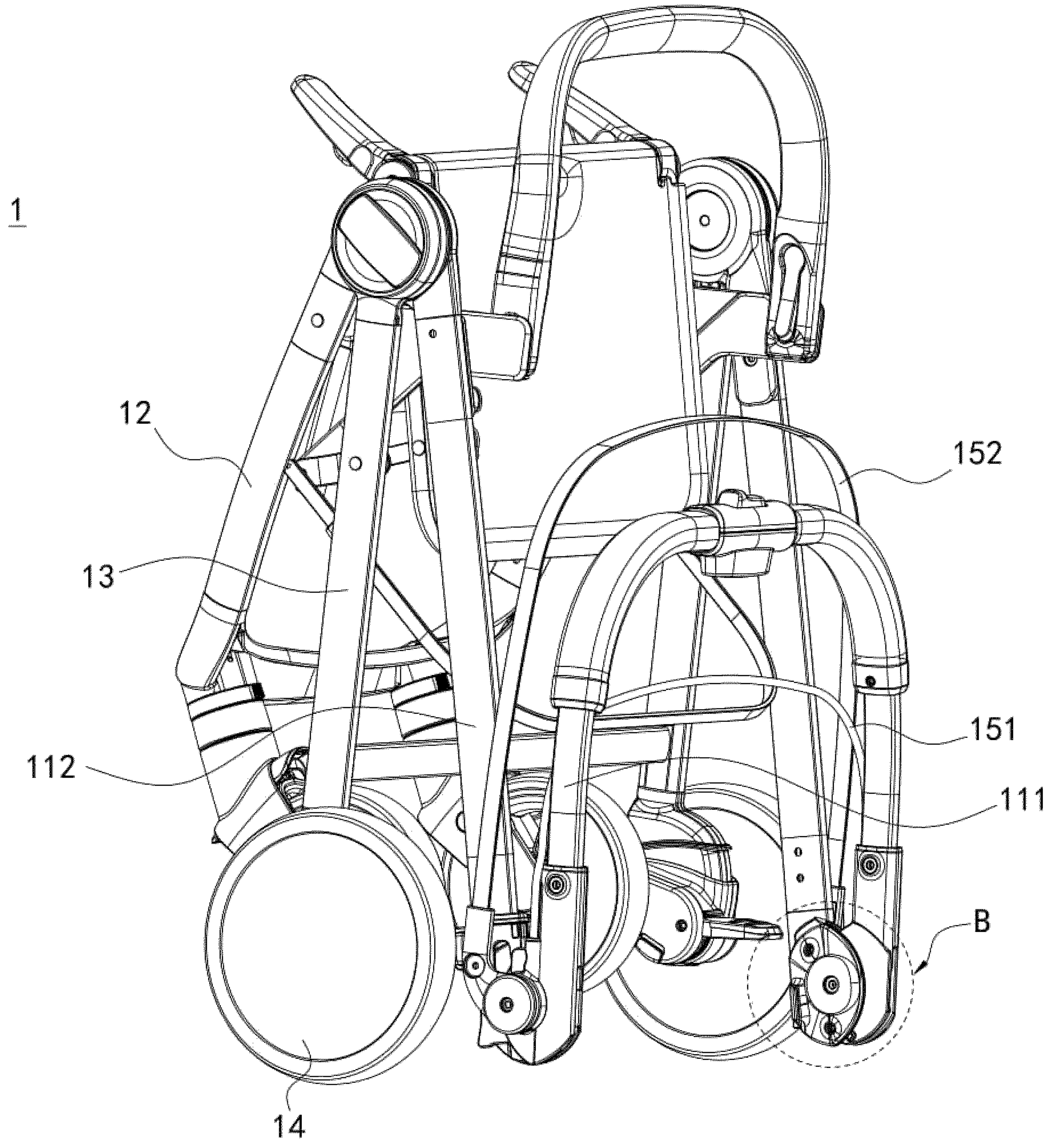
FIG. 6 is a perspective view of the baby carriage according to the embodiment of the present disclosure, in which the baby carriage is in the folded state.
Figure 7:
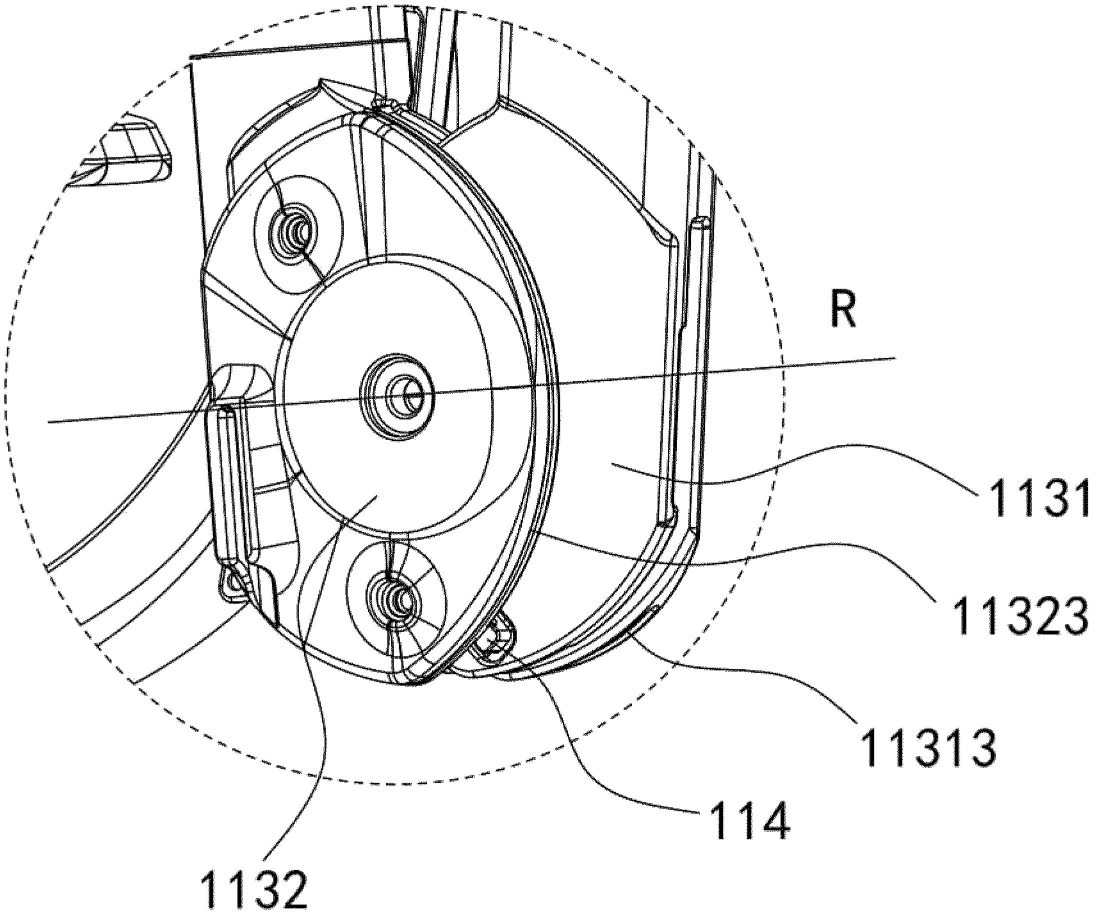
FIG. 7 is a partial enlarged view of a part B of FIG. 6.
Figure 8:
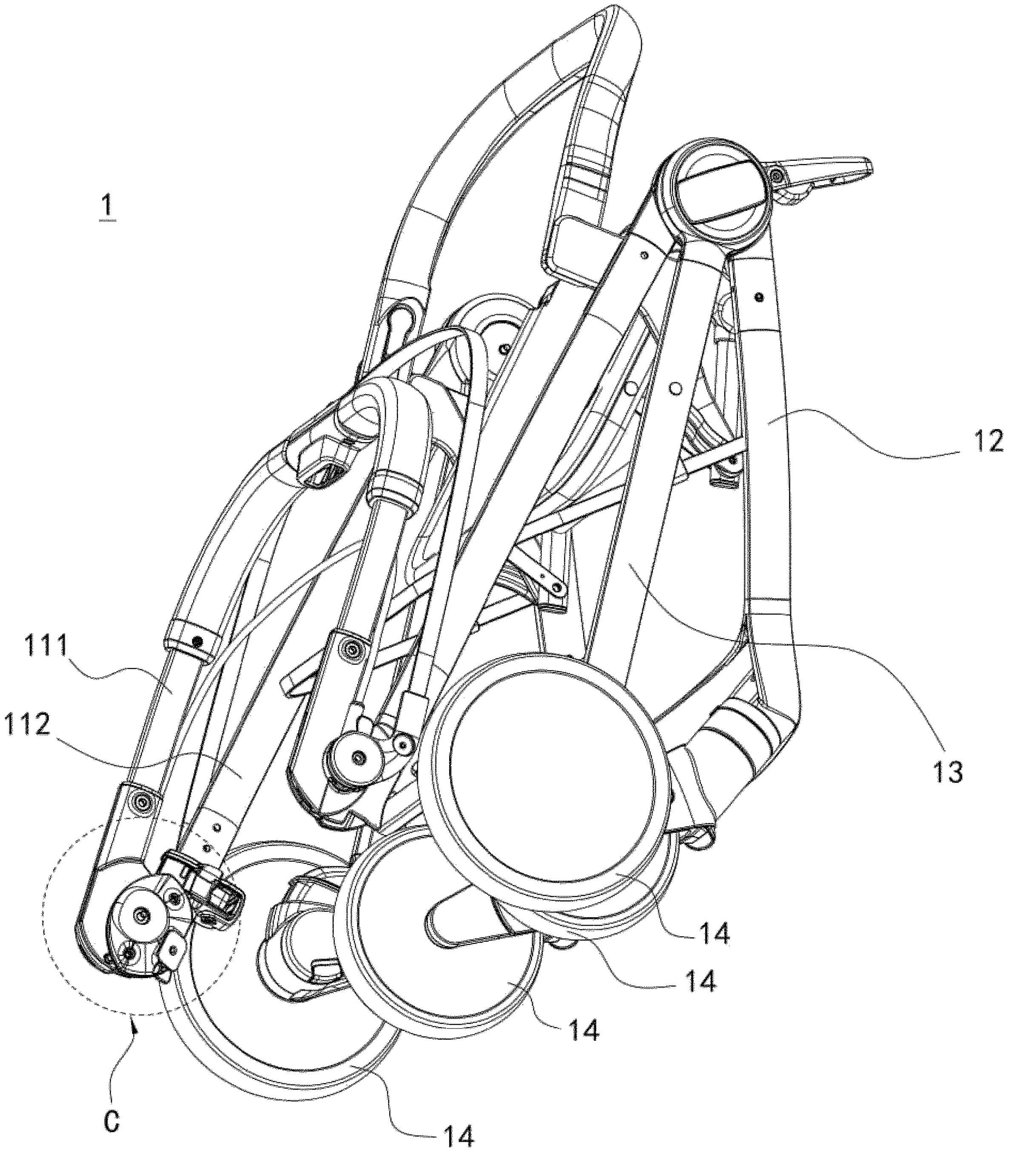
FIG. 8 is a perspective view of the baby carriage according to the embodiment of the present disclosure, in which the baby carriage is in the folded state.
Figure 9:
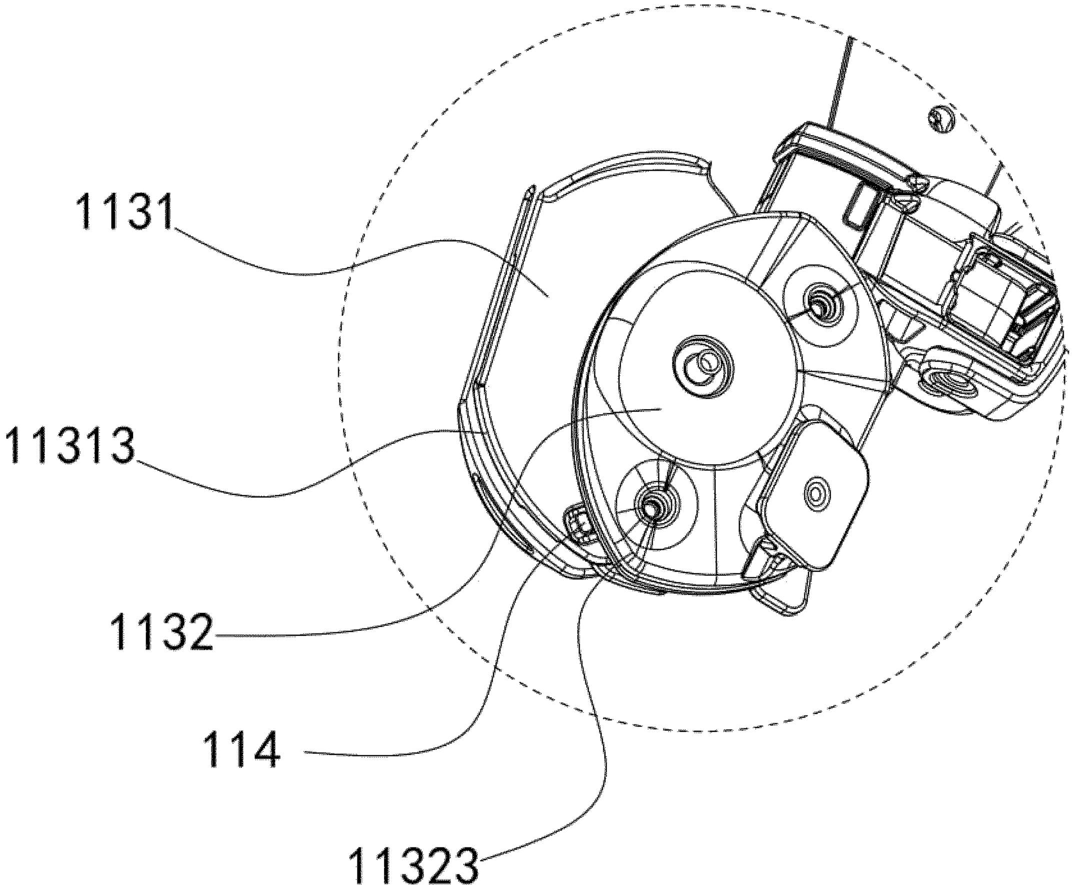
FIG. 9 is a partial enlarged view of a part C of FIG. 8.
Figure 10:
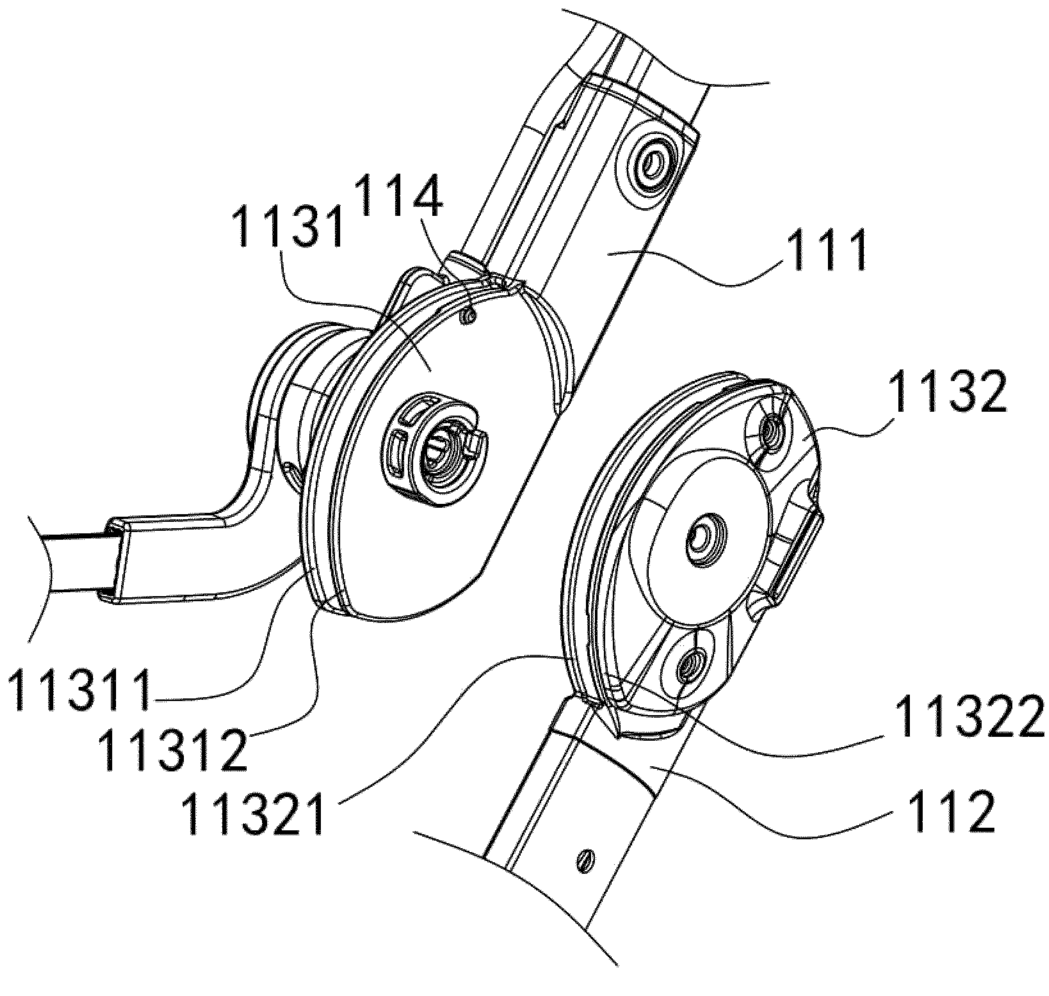
FIG. 10 is a partial perspective exploded view of a baby carriage according to another embodiment of the present disclosure.

FIG. 5 is an exploded perspective view of a part shown in FIG. 4; FIG. 6 is a perspective view of the baby carriage according to the embodiment of the present disclosure, in which the baby carriage is in the folded state; FIG. 7 is a partial enlarged view of a part B of FIG. 6; FIG. 8 is a perspective view of the baby carriage according to the embodiment of the present disclosure, in which the baby carriage is in the folded state; and FIG. 9 is a partial enlarged view of a part C of FIG. 8.

Referring to FIG. 5, the handle upper joint 111 includes a first pivoting part 1131. The handle lower joint 112 includes a second pivoting part 1132. The first pivoting part 1131 is provided with a limiting part 114. In the folded state, the limiting part 114 may block an edge 11323 of the second pivoting part 1132 to prevent the first pivoting part 1131 from pivoting towards the unfolded state with respect to the second pivoting part 1132.

The limiting part 114 may be formed as an elastic finger. As shown in FIG. 5, the limiting part 114 may be elastically deformed in a direction perpendicular to a surface of the first pivoting part 1131 (as shown by an arrow in FIG. 5), and an end of the limiting part 114 may form a projection protruding from the surface of the first pivoting part 1131. When the second pivoting part 1132 applies a force on the elastic finger over a threshold value, the elastic finger is elastically deformed so as not to prevent the second pivoting part 1132 from pivoting. An angle at which the projection faces towards a side of the second pivoting part 1132 may be designed according to requirement of the above threshold value. It can be understood that the threshold value is larger when the angle is steeper, and the threshold value is smaller when the angle is gentler.

Referring to FIG. 5, the first pivoting part 1131 has a first plate part 11311 and a second plate part 11312. The second pivoting part 1132 has a third plate part 11321 and a fourth plate part 11322. There is a gap between the first plate part 11311 and the second plate part 11312, and there is a gap between the third plate part 11321 and the fourth plate part 11322. The gap between the first plate part 11311 and the second plate part 11312 is suitable to accommodate one of the third plate part 11321 and the fourth plate part 11322. The gap between the third plate part 11321 and the fourth plate part 11322 is suitable to accommodate one of the first plate part 11311 and the second plate part 11312. The first plate part 11311 and the second plate part 11312 of the first pivoting portion 1131 and the third plate part 11321 and the fourth plate part 11322 of the second pivoting portion 1132 are staggered with each other, so that the first pivoting portion 1131 and the second pivoting portion 1132 are at least partially overlapped.

Referring to FIG. 7, when the frame of the baby carriage is in the folded state, the first pivoting part 1131 is partially overlapped with the second pivoting part 1132, and the limiting part 114 contacts the edge 11323 of the second pivoting part 1132 to prevent the first pivoting part 1131 from pivoting towards the unfolded state. Therefore, when the frame of the baby carriage is in the folded state, the handle upper joint 111 and/or the first canopy bracket 151 and/or the second canopy bracket 152 which is/are moving along with the handle upper joint 111 may be kept in the completely folded state without being partially unfolded due to gravity or shaking. When the baby carriage 1 needs to be unfolded, the handle upper joint 111 may be pivoted by applying a force exceeding the threshold value, so that the second pivoting part 1132 forces the limiting part 114 to be elastically deformed and no longer obviously protrude from the surface of the first pivoting part 1131, so that the first pivoting part 1131 is no longer prevented from pivoting outwards, thereby making the baby carriage 1 unfolded smoothly.

With continued reference to FIG. 7, the limiting part 114 is arranged at a plurality of positions of the first pivoting part 1131, as long as the limiting part 114 contacts the edge 11323 of the second pivoting part 1132 and is lower than a common pivoting axis R of the first pivoting part 1131 and the second pivoting part 1132 in the folded state. The position of the limiting part 114 may be appropriately adjusted after considering other components (for example, a seat cloth) of the baby carriage 1.

Although in this embodiment, the limiting part 114 is provided on the first pivoting part 1131, and in other embodiments, the limiting part 114 may also be provided on the second pivoting part 1132. In this way, in the folded state, the limiting part 114 blocks an edge 11313 of the first pivoting part 1131 to prevent the first pivoting part 1131 from pivoting towards the unfolded state with respect to the second pivoting part 1132. When the first pivoting part 1131 applies a force on the limiting part over the threshold value, the limiting part is elastically deformed so as not to prevent the second pivoting part 1132 from pivoting.

Figure 11:
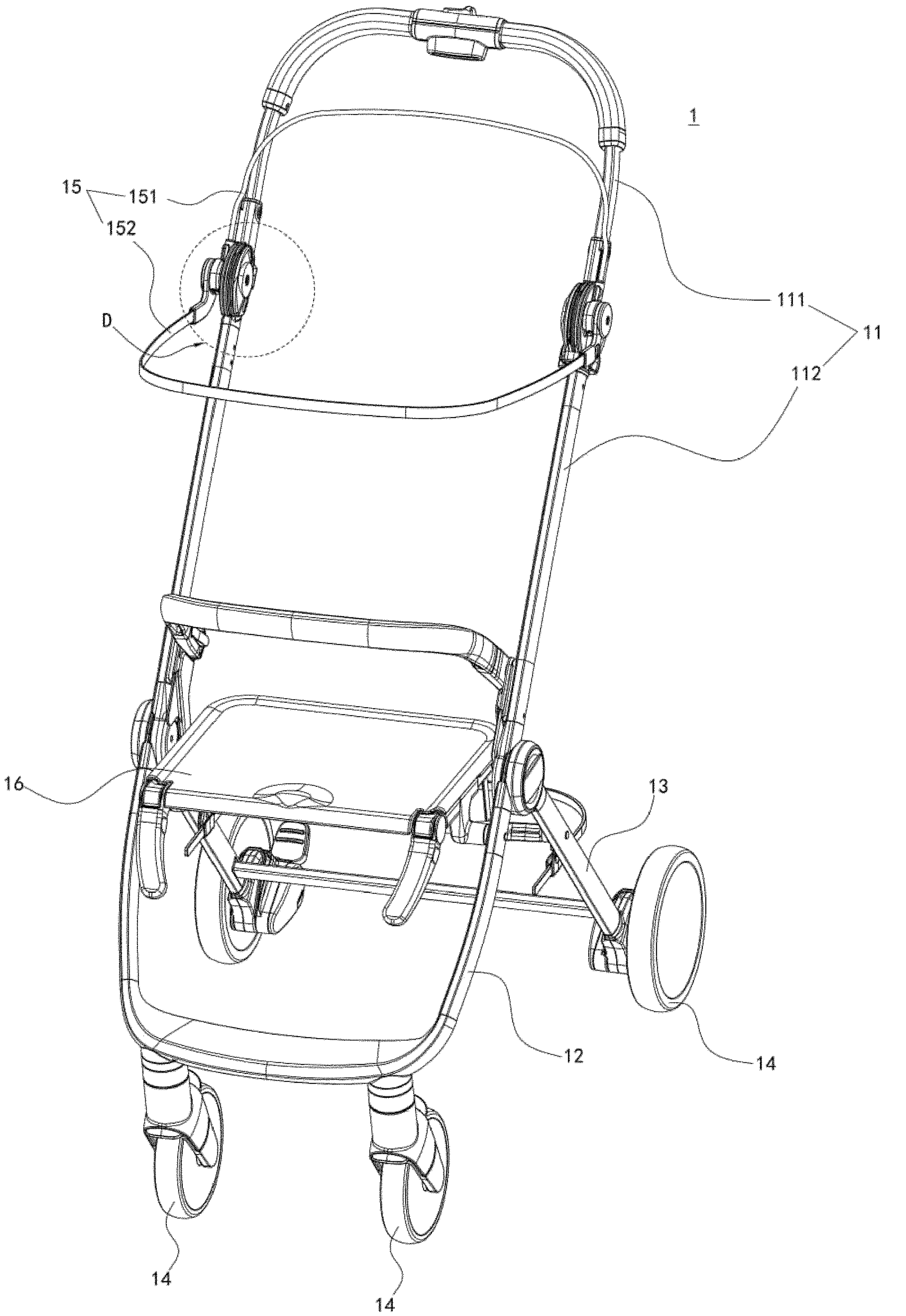
FIG. 11 is a perspective view of the baby carriage according to the another embodiment of the present disclosure, in which the baby carriage is in an unfolded state.
Figure 12:
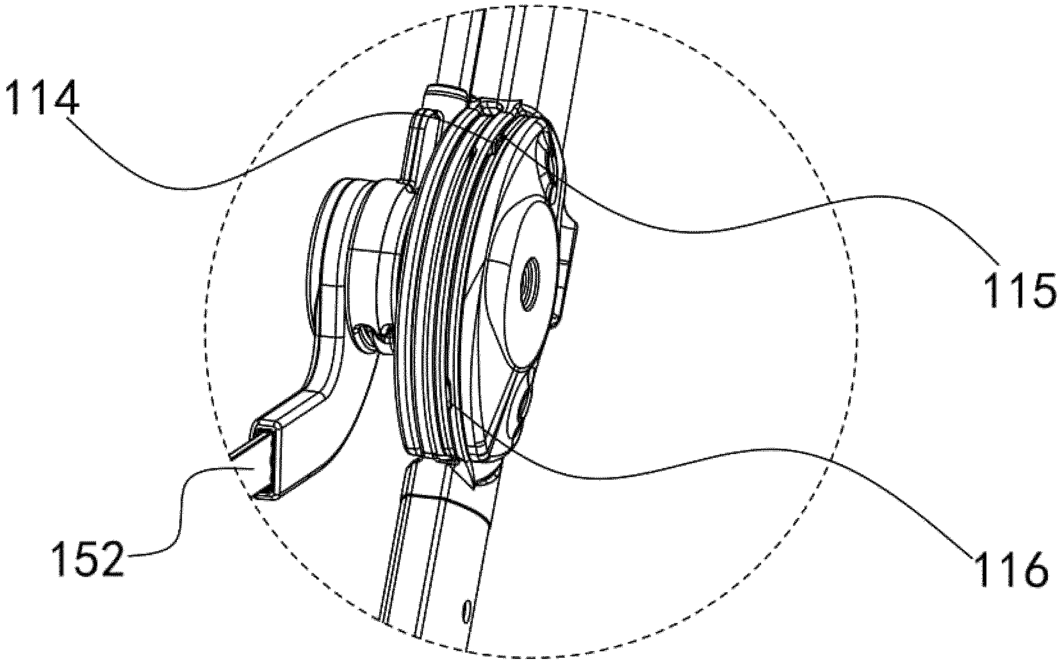
FIG. 12 is a partial enlarged view of a part D of FIG. 11.
Figure 13:
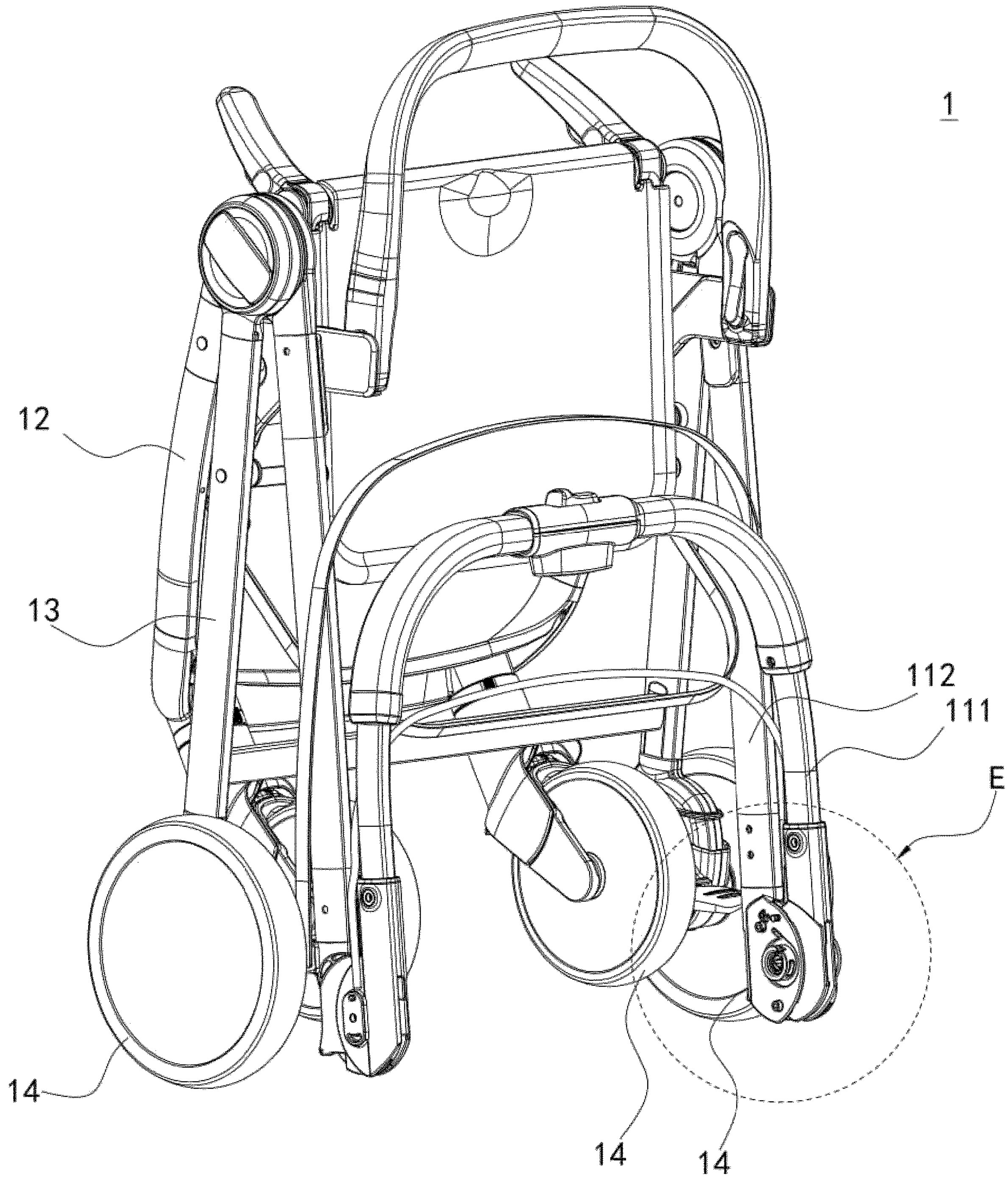
FIG. 13 is a perspective view of the baby carriage according to the another embodiment of the present disclosure, in which the baby carriage is in the folded state.
Figure 14:
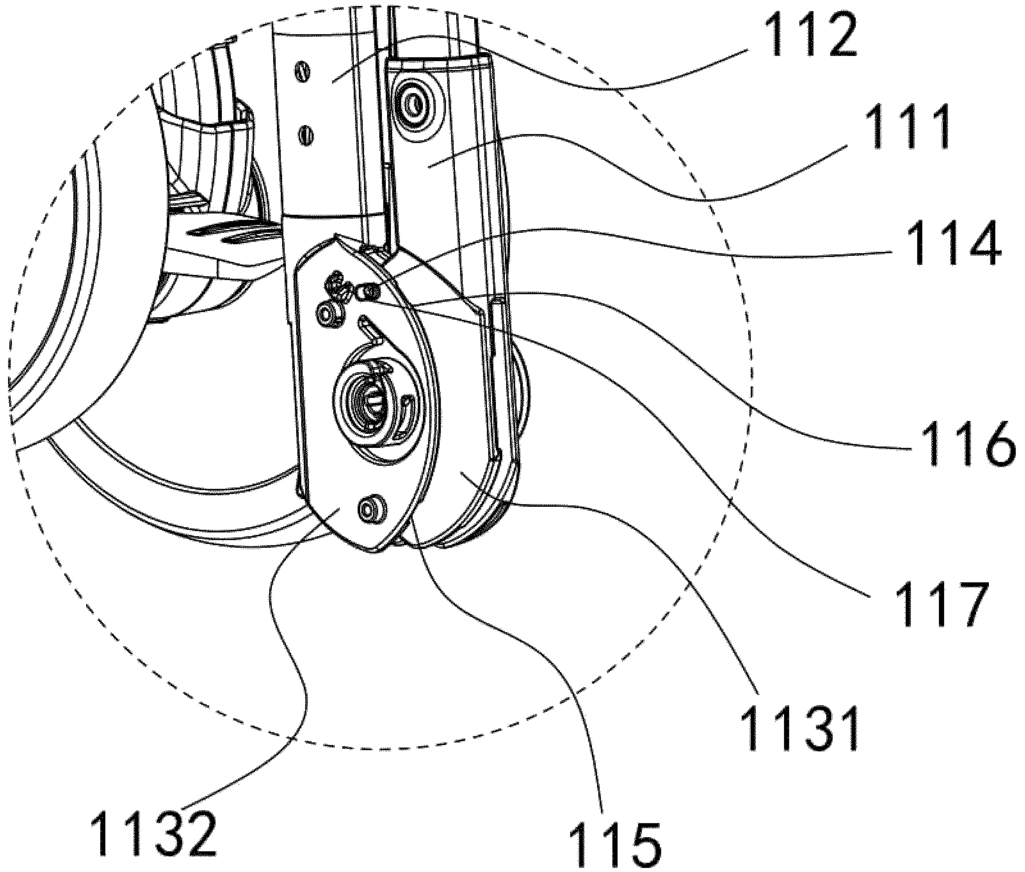
FIG. 14 is a partial enlarged view of a part E of FIG. 13.
Figure 15:
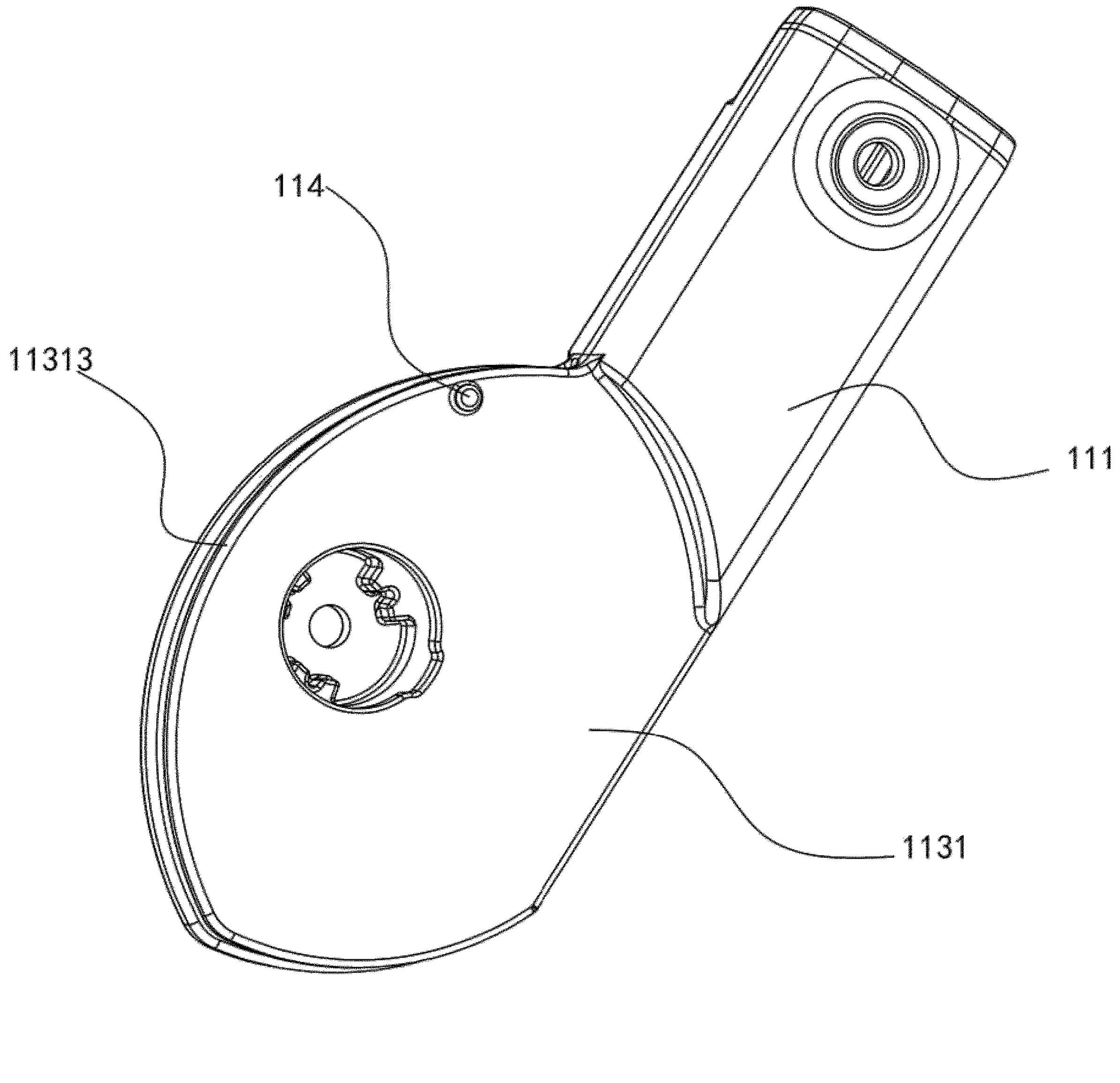
FIG. 15 is a perspective view of a handle upper joint according to the another embodiment of the present disclosure.
Figure 16:
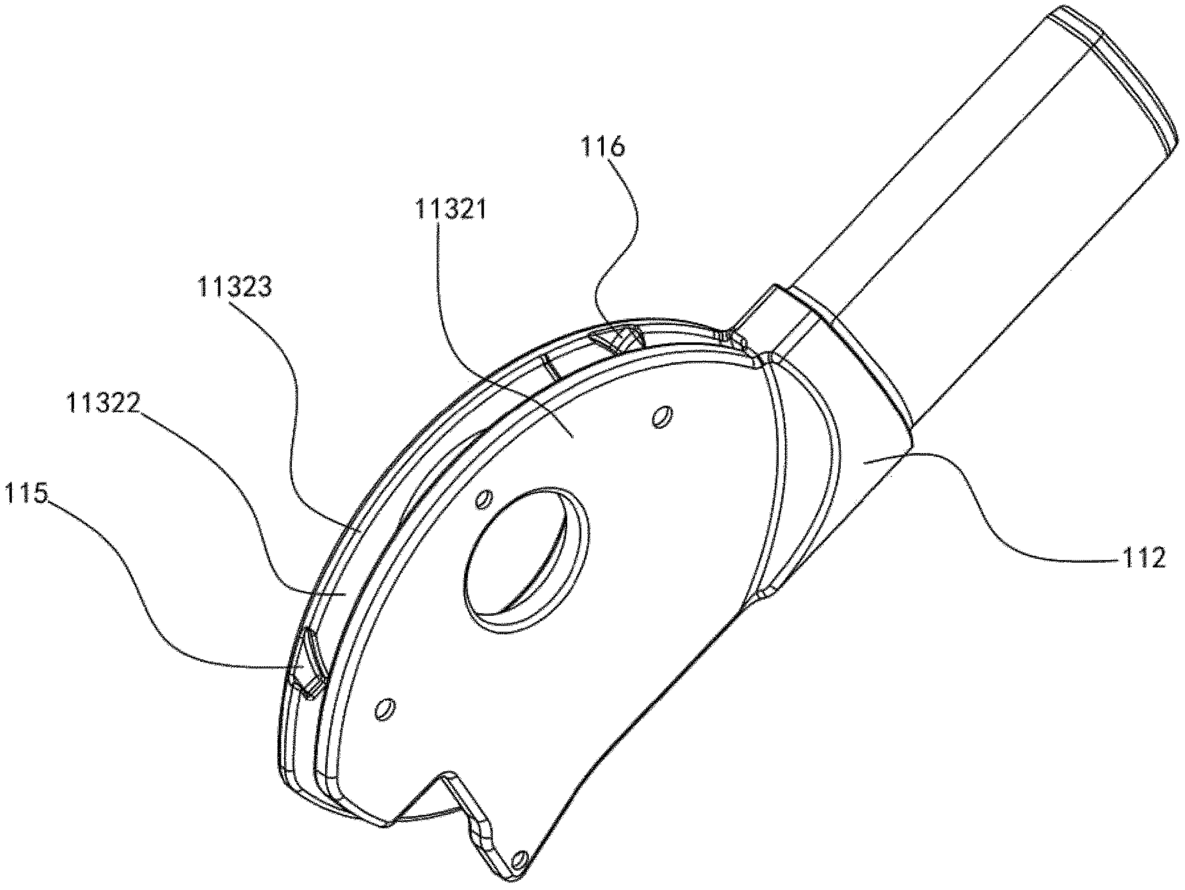
FIG. 16 is a perspective view of a handle lower joint according to the another embodiment of the present disclosure.
Figure 17:
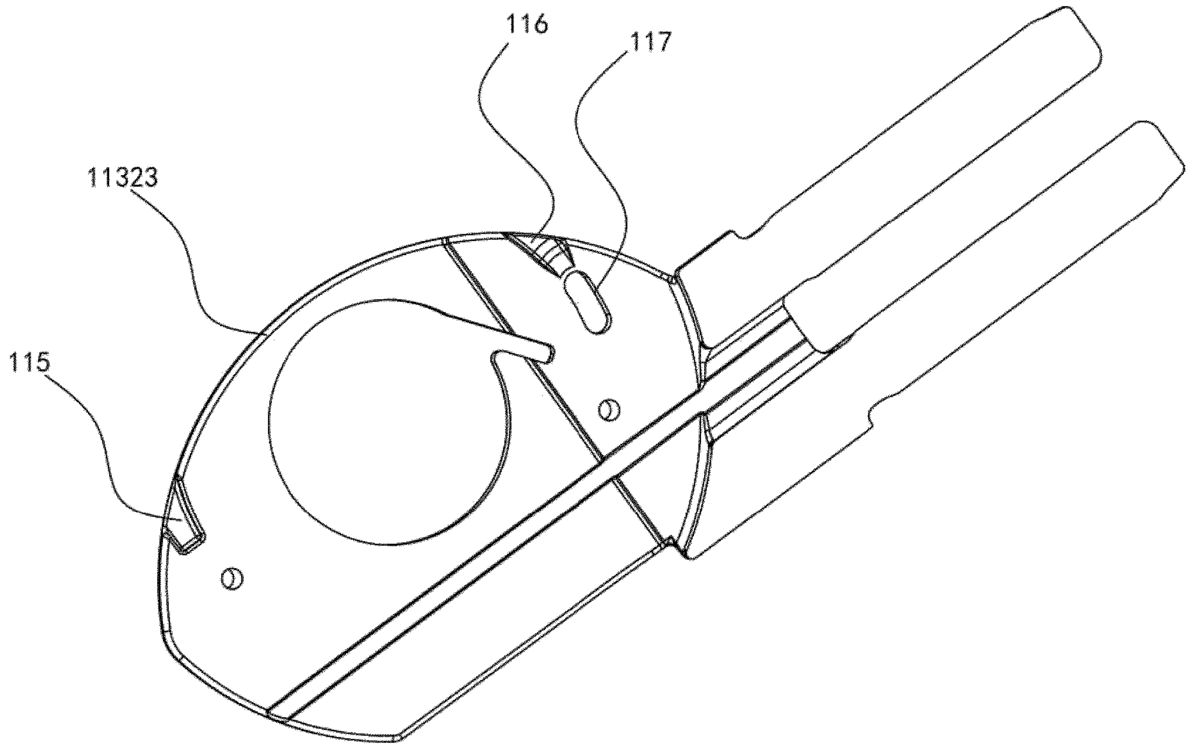
FIG. 17 is a schematic view of the handle lower joint according to the another embodiment of the present disclosure, showing an internal structure of the handle lower joint.
Figure 18:
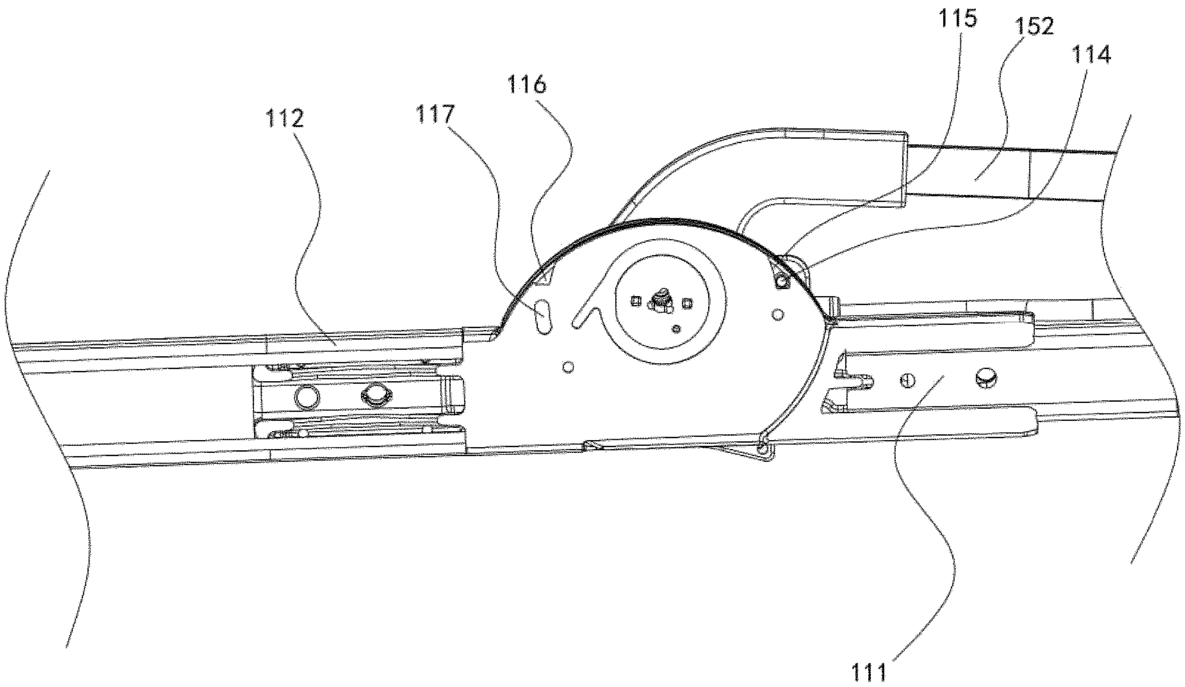
FIG. 18 is a partial schematic view of the baby carriage according to the another embodiment of the present disclosure, in which the baby carriage is in the unfolded state.
Figure 19:
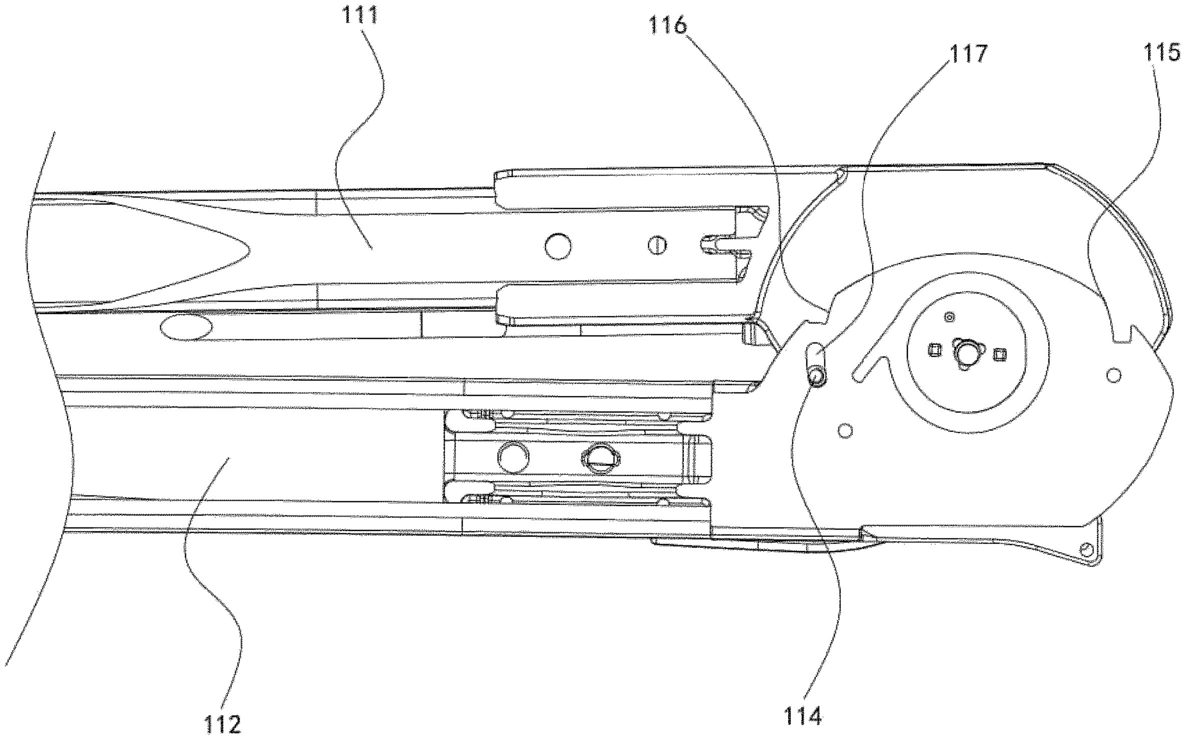
FIG. 19 is a partial schematic view of the baby carriage according to the another embodiment of the present disclosure, in which the baby carriage is in the folded state.

FIG. 11 is a perspective view of the baby carriage according to another embodiment of the present disclosure, in which the baby carriage is in an unfolded state; FIG. 12 is a partial enlarged view of a part D of FIG. 11; FIG. 13 is a perspective view of the baby carriage according to the another embodiment of the present disclosure, in which the baby carriage is in the folded state; FIG. 14 is a partial enlarged view of a part E of FIG. 13; FIG. 15 is a perspective view of a handle upper joint according to the another embodiment of the present disclosure; FIG. 16 is a perspective view of a handle lower joint according to the another embodiment of the present disclosure; FIG. 17 is a schematic view of the handle lower joint according to the another embodiment of the present disclosure, showing an internal structure of the handle lower joint; FIG. 18 is a partial schematic view of the baby carriage according to the another embodiment of the present disclosure, in which the baby carriage is in the unfolded state; and FIG. 19 is a partial schematic view of the baby carriage according to the another embodiment of the present disclosure, in which the baby carriage is in the folded state.

Only differences between this embodiment and the aforementioned embodiment will be described below, and the same parts will be omitted to avoid repetition.

In the another embodiment, as shown in FIG. 15, the limiting part 114 is formed as a projection and provided on the first pivoting part 1131. As shown in FIGS. 12 and 14, the second pivoting part 1132 has an unfolding groove 115, a folding groove 116 and a limiting hole 117. In the unfolded state, the limiting part 114 is located in the unfolding groove 115 (as shown in FIG. 12). During a process from the unfolded state to the folded state, for example by pivoting, the limiting part 114 leaves the unfolding groove 115 and moves out of the second pivoting part 1132, then enters the folding groove 116, and finally leaves the folding groove 116 and enters the limiting hole 117 (as shown in FIG. 14), so that the projection is held within the limiting hole 117. The limiting hole 117 may have a certain length to allow the handle upper joint 111 to pivot within a certain range.

During pivoting from the folded state to the unfolded state, a force exceeding the threshold may be applied to the handle upper joint 111, so that the limiting part 114 overcomes the blocking of the edge of the limiting hole 117 and leaves the limiting hole 117. When the limiting part 114 is located between the limiting hole 117 and the folding groove 116, the limiting part 114 may contact the second pivoting part 1132 and generate friction. The handle upper joint 111 is further unfolded, so that the limiting part 114 finally returns to the unfolding groove 115 (as shown in FIG. 18).

As shown in FIG. 17, the unfolding groove 115 and the folding groove 116 are formed at the edge 11323 of the second pivoting part 1132. As shown in FIG. 15, the limiting part 114 (projection) may be formed at the edge 11313 of the first pivoting part 1131. The unfolding groove 115 and the folding groove 116 may prevent unnecessary wear of the limiting part 114. The folding groove 116 has a guiding function, which may guide the limiting part 114 during pivoting from the unfolded state to the folded state, and the limiting part 114 may move into the limiting hole 117 along the folding groove 116.

Referring to FIGS. 18 and 19, the unfolding groove 115, the folding groove 116, and the limiting hole 117 may be generally formed at a circumference of a circle centered on the pivoting axis of the first pivoting part 1131 and the second pivoting part 1132.

A diameter range of the limiting part 114 (bump) may be 2 mm-5 mm, and a height range of the limiting part 114 may be 1 mm-3 mm, but the present disclosure is not limited thereto.

It can be understood that although the limiting part 114 is arranged on the first pivoting part 1131 in this embodiment. In other embodiments, the limiting part 114 may also be arranged on the second pivoting part 1132, and the unfolding groove 115, the folding groove 116 and the limiting hole 117 are correspondingly arranged on the first pivoting part 1131. In this way, in the folded state, the limiting part 114 (bump) is constrained by the limiting hole 117 on the first pivoting part 1131 to prevent the first pivoting part 1131 from pivoting towards the unfolded state with respect to the second pivoting part 1132. When a force exceeding the threshold value is applied to the handle upper joint 111, the limiting part 114 is separated from the limiting hole 117, so that the first pivoting part 1131 pivots and be unfolded with respect to the second pivoting part 1132.

In other embodiments, the limiting part 114 formed as the elastic finger and the limiting part 114 formed as the bump may be used at the same time, and both of them may be provided on the first pivoting part 1131 or the second pivoting part 1132 at the same time, or may be provided on the first pivoting part 1131 and the second pivoting part 1132 respectively. In addition, the number of elastic fingers and bumps may also vary.

Those skilled in the art will easily think of other embodiments of the present disclosure after considering the specification and practicing the present disclosure as mentioned above. The present disclosure is intended to cover any variations, uses or adaptations of the present disclosure, which follow the general principles of the present disclosure and include common knowledge or common technical means in the technical field that are not disclosed in the present disclosure. Also, the specification and its embodiments are to be regarded as examples only, and the scope and spirit of the present disclosure are indicated by the claims of the present disclosure.

Although the present disclosure has been described with reference to the examples of typical embodiments, the terms used are illustrative and exemplary, rather than restrictive. Since the present disclosure may be embodied in various forms without departing from the spirit and essence of the present disclosure, it should be understood that the above-mentioned embodiments are not limited to any of the foregoing details, but should be interpreted in the broadest sense within the scope defined by the claims, so all changes that fall within the scope of the claims or their equivalents should be covered by the claims.

What is claimed is:

1. A baby carriage having an unfolded state and a folded state, and comprising:

a handle;

a front leg; and a rear leg, wherein the handle, the front leg and the rear leg are pivotable to the unfolded state or the folded state with respect to each other, wherein the handle comprises a handle upper joint and a handle lower joint, and the handle upper joint and the handle lower joint are pivotable to the unfolded state or the folded state with respect to each other, and wherein the baby carriage further comprises a limiting part, and in the folded state, the limiting part is configured to prevent the handle upper joint from pivoting towards the unfolded state until a force above a threshold value is applied to the handle upper joint relative to the handle lower joint such that the limiting part allows for the handle upper joint to pivot towards the unfolded state.

2. The baby carriage according to claim 1, further comprising a first canopy bracket, and the first canopy bracket and the handle upper joint pivot together along a same pivot axis.

3. The baby carriage according to claim 1, wherein the handle upper joint comprises a first pivoting part, the handle lower joint comprises a second pivoting part, the limiting part is provided on the first pivoting part, and in the folded state, the limiting part blocks an edge of the second pivoting part to prevent the first pivoting part from pivoting towards the unfolded state with respect to the second pivoting part.

4. The baby carriage according to claim 3, wherein the limiting part is formed as an elastic finger, and when the second pivoting part applies a force on the elastic finger over the threshold value, the elastic finger is elastically deformed to allow the second pivoting part to pivot.

5. The baby carriage according to claim 3, wherein the limiting part is formed as a projection, and the second pivoting part has an unfolding groove, a folding groove and a limiting hole, wherein in the unfolded state, the projection is located in the unfolding groove, and during pivoting from the unfolded state to the folded state, the projection enters into the limiting hole through the folding groove.

6. The baby carriage according to claim 5, wherein the unfolding groove and the folding groove are formed at an edge of the second pivoting part, and the projection is formed at an edge of the first pivoting part.

7. The baby carriage according to claim 1, wherein the handle upper joint comprises a first pivoting part, the handle lower joint comprises a second pivoting part, the second pivoting part is provided with a limiting part, and in the folded state, the limiting part blocks the first pivoting part from pivoting towards the unfolded state with respect to the second pivoting part.

8. The baby carriage according to claim 7, wherein the limiting part is formed as an elastic finger, and when the first pivoting part applies a force on the elastic finger over the threshold value, the elastic finger is elastically deformed to allow the second pivoting part to pivot.

9. The baby carriage according to claim 7, wherein the limiting part is formed as a projection, and the first pivoting part has an unfolding groove, a folding groove and a limiting hole, wherein in the unfolded state, the projection is located in the unfolding groove, and during pivoting from the unfolded state to the folded state, the projection enters into the limiting hole through the folding groove.

10. The baby carriage according to claim 9, wherein the unfolding groove and the folding groove are formed at an edge of the first pivoting part, and the projection is formed at an edge of the second pivoting part.

11. The baby carriage according to claim 3, wherein each of the first pivoting part and the second pivoting part respectively has two plate parts, and there is a gap between the two plate parts of each of the first pivoting part and the second pivoting part, and the two plate parts of the first pivoting part and the two plate parts of the second pivoting part are staggered and at least partially overlapped with each other.

12. The baby carriage according to claim 7, wherein each of the first pivoting part and the second pivoting part respectively has two plate parts, and there is a gap between the two plate parts of each of the first pivoting part and the second pivoting part, and the two plate parts of the first pivoting part and the two plate parts of the second pivoting part are staggered and at least partially overlapped with each other.

13. A baby carriage, comprising:

a handle upper joint;

a handle lower joint, and the handle upper joint and the handle lower joint are pivotable to an unfolded state or a folded state with respect to each other; and a limiting part, and in the folded state, the limiting part prevents the handle upper joint from pivoting towards the unfolded state;

wherein the limiting part is formed as an elastic finger, and when a force applied to the elastic finger is over a threshold value, the elastic finger is elastically deformed to allow the relative rotation between the handle upper joint and the handle lower joint.

* * * * *